Patented July 31, 1923.

1,463,399

UNITED STATES PATENT OFFICE.

CHARLES ARTHUR LONGBOTTOM, OF WORKSOP, AND FREDERICK LINDLEY DUFFIELD, OF BRASSINGTON, ENGLAND.

MANUFACTURE OF REFRACTORY PRODUCTS FROM DOLOMITE.

No Drawing.     Application filed December 1, 1922.   Serial No. 604,417.

*To all whom it may concern:*

Be it known that we, CHARLES ARTHUR LONGBOTTOM, of Forest Hill, Worksop, in the county of Nottingham, England, and FREDERICK LINDLEY DUFFIELD, of Harboro' Rocks Farm, Brassington, in the county of Derby, England, both subjects of the King of Great Britain and Ireland, have invented certain new and useful Improvements Relating to the Manufacture of Refractory Products from Dolomite, for which we have filed an application in Great Britain, Ser. No. 18,110, bearing date the 4th July, 1921, and of which the following is a specification.

This invention relates to the manufacture of refractory products from dolomite. These products are mainly bricks for use in linings and the like in metallurgical furnaces, and as such we will subsequently refer to them except in the appended claims.

The practical brick is one possessing the attributes of high refractoriness, durability, and immunity from change of volume under all conditions, whether those incident to service under intense heat or when exposed to atmospheric action.

Many attempts have been made to produce such a brick, but with varying success. For example, sundry materials possessing binding characteristics have been artificially mixed with raw dolomite in defined proportions, and the resulting mixture formed into bricks which have been subjected to intense heat to shrink them well below their original dimensions. Sometimes the mixed material has been subjected to intense shrinkage heat before shaping into bricks; a temperature as high as 1800° centigrade has been suggested.

The binding materials adopted in one case have been iron oxide or clay, and in another silica, alumina and iron oxide. As substitutes, basic open-hearth slag, blast-furnace slag, bauxite or chrome ore, and neutral slag wool have been proposed.

However, despite all these attempts at improvement the bricks, as at present produced, are still defective one way or another in service, and we, by our present invention, have sought to remove the disadvantages by a particular proportional mixing of the dolomite and the binders coupled with subjecting the shaped bricks to an intense shrinkage and to a particular finishing treatment destroying their inherent tendency to absorb moisture or gas, or, in other words, sealing their pores or interstices against absorption.

Therefore, our invention consists in artificially mixing binding materials with the raw dolomite, shaping the bricks from the mixture, subjecting them to an intense shrinking heat, and finally dipping them in a medium having sealing properties.

The dolomite and the binders are prepared for mixing and mixed in any of the ways well known in the art, and the shaping into bricks and their subsequent shrinkage are effected likewise, whilst the dipping is performed in any manner adopted in the art or one analogous thereto.

We mix two binders with the dolomite, and those we recommend are either iron oxide and clay or slag and clay. The most advantageous proportions, by weight, are, when iron oxide and clay are employed in admixture, 2 to 10 per cent of iron oxide and 2 to 15 per cent of clay; in the other case, the proportions are alike, namely 2 to 10 per cent of slag and of clay.

The bricks composed of either of these mixtures are subjected to a heat of 1500° centigrade or thereabouts until they shrink 50 to 57 per cent of their original volume, whereupon, as they leave the kiln or other source of heat, they are dipped or submerged in molten wax or tallow or dehydrated oils or fats or other medium functioning to close or seal the pores.

Consequently, by the intense shrinkage the bricks are rendered of great homogeneity and strength, whilst the action of the wax or other sealing medium effectually proofs them against permeation of moisture or gas. Hence we provide a brick presenting reliable and efficient service.

What we claim and desire to secure by Letters Patent is:—

1. The herein-described process for the manufacture of refractory products from dolomite which consists in artificially mixing binding materials with the raw dolomite, shaping the products from the mixture, subjecting them to an intense shrinking heat, and finally dipping them in a medium having sealing properties.

2. The herein-described process for the manufacture of refractory products from dolomite which consists in artificially mixing binding materials with the raw dolomite, shaping the products from the mixture, subjecting them to a heat, shrinking them 50 to 57 per cent of their original volume, and finally dipping them in a liquid for sealing the pores.

3. The herein-described process for the manufacture of refractory products from dolomite which consists in artificially mixing iron oxide and clay with the raw dolomite, shaping the products from the mixture, subjecting them to a heat of 1500° centigrade approximately and finally dipping them in a pore-sealing liquid.

4. The herein-described process for the manufacture of refractory products from dolomite which consists in artificially mixing binding materials with the raw dolomite, shaping the products from the mixture, subjecting them to a heat of 1500° centigrade approximately, and finally dipping them in a pore-sealing liquid.

5. As an article of commerce, a refractory product composed of a mixture of dolomite and binding agents shrunk to approximately half its initial dimensions and sealed against porosity by an externally-applied medium, substantially as described.

In testimony whereof, we affix our signatures.

CHARLES ARTHUR LONGBOTTOM.
FREDERICK LINDLEY DUFFIELD.